(12) United States Patent
Misawa et al.

(10) Patent No.: US 7,537,364 B2
(45) Date of Patent: May 26, 2009

(54) DOOR HANDLE PORTION ILLUMINATION SYSTEM

(75) Inventors: Akihiro Misawa, Aichi (JP); Mitsuhiro Nawashiro, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 64 days.

(21) Appl. No.: 11/709,717

(22) Filed: Feb. 23, 2007

(65) Prior Publication Data

US 2007/0206388 A1    Sep. 6, 2007

(30) Foreign Application Priority Data

Mar. 6, 2006    (JP) .................. P2006-058904

(51) Int. Cl.
  *B60Q 1/26* (2006.01)
  *F21V 8/00* (2006.01)
(52) U.S. Cl. ............... 362/501; 362/511
(58) Field of Classification Search ........... 362/501, 362/510, 511; 16/444, 903
  See application file for complete search history.

(56) References Cited

U.S. PATENT DOCUMENTS 5,297,010 A * 3/1994 Camarota et al. ........... 362/501
6,164,805 A * 12/2000 Hulse .................... 362/501
6,758,584 B2 * 7/2004 Bach et al. ............... 362/399
7,334,923 B2 * 2/2008 Tanaka et al. ............. 362/494
2004/0223336 A1 * 11/2004 Murakami et al. .......... 362/501
2005/0286262 A1 * 12/2005 Gasquet et al. ........... 362/555
2007/0086201 A1 * 4/2007 Wang .................... 362/501
2007/0195542 A1 * 8/2007 Metros et al. ............ 362/501

FOREIGN PATENT DOCUMENTS

JP    3-125768    5/1991
JP    8-318783    12/1996

* cited by examiner

*Primary Examiner*—Stephen F. Husar
*Assistant Examiner*—Peggy A. Neils
(74) *Attorney, Agent, or Firm*—McGinn IP Law Group, PLLC

(57) ABSTRACT

A door handle portion illumination system for illuminating a door handle portion including a door handle, and a concave portion that is formed on a vehicle body in a position which lies at the rear of the door handle, the door handle portion illumination system including a light transmitting element that is incorporated in the door handle and which includes a luminous surface including, in turn, an area which is exposed on a front side of the door handle and an area which faces an edge portion of the concave portion, and a light source which emits a light that is introduced into the light transmitting element.

15 Claims, 4 Drawing Sheets

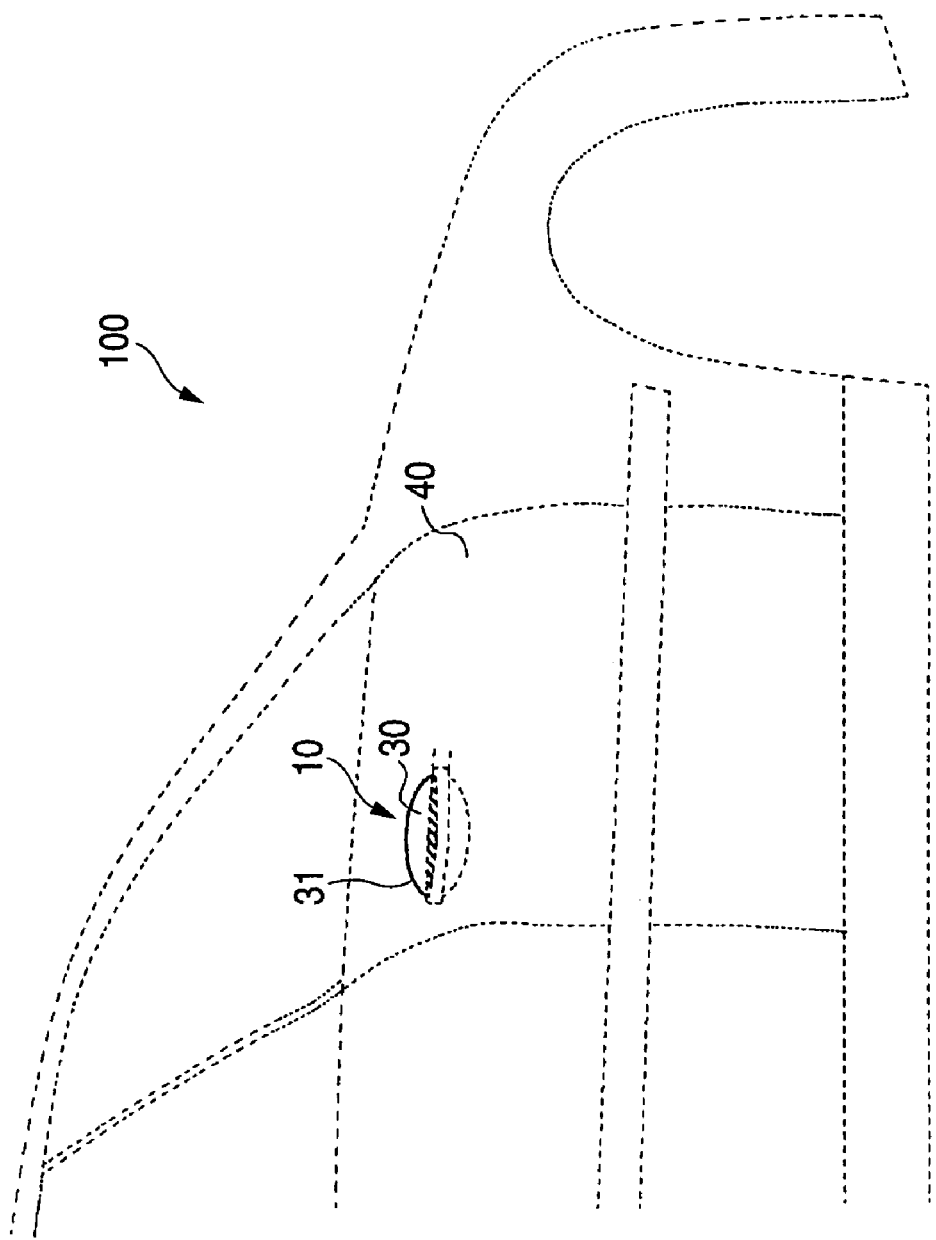

DOOR HANDLE PORTION ILLUMINATION SYSTEM

BACKGROUND OF THE INVENTION

1. Field of the Invention

The present invention relates to a system for illuminating a door handle portion of a vehicle

2. Description of the Related Art

As a device for illuminating a door handle portion of a vehicle at night, there is an invention in which a illumination lamp is disposed within a door handle on a front side thereof to illuminate the door handle (refer to, for example, JP-A-08-318783). A person who opens or closes a door of the vehicle at night can recognize the position of the door handle for the door by the illumination so provided.

On the other hand, there is another invention in which a light source is disposed within a door handle on a rear side thereof for indirect illumination of a concave portion which is formed on a vehicle body in a position which lies at the rear of the door handle (refer to, for example, JP-A-03-125768). A person who opens or closes a door at night can recognize the positions of the concave portion on the vehicle body and the door handle through this indirect illumination.

Incidentally, when a person (the driver or an occupant in his or her vehicle) who opens or closes a door of the vehicle actually opens or closes the door, the person inserts his or her hand into an insertion opening produced between a door handle for the relevant door and a concave portion which is formed on a vehicle body in a position which lies at the rear of the door handle so as to pull or push the door the door handle for a required operation of the door. At night, the person inserts his or her hand into the insertion opening depending on an illumination provided on the door handle to open or close the door.

As with the conventional configurations, however, in the event that the front side of the door handle is illuminated, although the position of the door handle can be grasped, it becomes difficult to determine on the position of the concave portion on the vehicle body which lies behind the door handle. In addition, also in the event that the light emitting device is provided on the rear side of the door handle to indirectly illuminate the concave portion on the vehicle body, there exists a risk that depending on the body color of the vehicle or the color of illumination light, the illumination effect cannot be exhibited sufficiently, and hence, it becomes difficult to grasp accurately the positions of the door handle and the concave portion on the vehicle body. Because of this, when the person extends his or her hand to grip the door handle, there occurred a case where a momentary hesitation was generated and the gripping of the door handle in an ensured manner was made difficult.

Then, a problem that the invention is to be solved is to provide a illumination system which facilitates the opening or closing operation of a door of the vehicle at night to enhance the convenience on such an occasion.

With a view to solving the problem, according to the invention, the following configurations will be provided. According to a first configuration of the invention, there is provided a door handle portion illumination system for illuminating a door handle portion including:

a door handle; and a concave portion that is formed on a vehicle body in a position which lies at the rear of the door handle; the door handle portion illumination system including:

a light transmitting element that is incorporated in the door handle and which includes a luminous surface comprising, in turn, an area which is exposed on a front side of the door handle and an area which faces an edge portion of the concave portion; and a light source which emits a light that is introduced into the light transmitting element.

According to the door handle portion illumination system that is configured as has been described above, part of light of the light source which is introduced into the light transmitting element is emitted from part (the area that is exposed on the front side of the door handle) of the luminous surface towards the front side (an outside of the vehicle), whereby the door handle is illuminated for its position to be displayed. On the other hand, a light that is emitted from the area of the luminous surface of the light transmitting element which faces the edge portion of the concave portion on the vehicle body illuminates the edge portion of the concave portion on the vehicle body, whereby the light is concentrated on the relevant edge portion so that the edge portion is allowed to appear as a bright line. Consequently, the person (the driver or the like) who opens or closes the door visually recognizes the illumination produced on the luminous surface of the light transmitting element and the bright line produced along the edge portion of the concave portion on the vehicle body to thereby grasp the position of the door handle, as well as the position of the concave portion on the vehicle body, whereby when the person extends his or her hand to open or close the door, the person can grip the door handle in an ensured fashion without any hesitation.

According to a second configuration of the invention, in the first configuration, the luminous surface of the light transmitting element is gradually increased in width as the luminous surface goes away from the light source.

The intensity of light introduced into the light transmitting element is dampened as it travels through the interior of the light transmitting element. Consequently, the intensity of the light emitted from the luminous surface of the light transmitting element is also dampened as the luminous surface goes farther away from the light source, leading to a cause for irregular illumination. As has been described above, in the event that the luminous surface of the light transmitting element is made to be gradually increased in width as it goes farther away from the light source, the amount of light emitted from portions on the luminous surface which are located farther away from the light source can be compensated for to thereby reduce the irregular illumination.

According to a third configuration of the invention, in the first configuration, the luminous surface of the light transmitting element is formed continuously along a longitudinal direction of the door handle.

By forming the luminous surface of the light transmitting element continuously, the position of the door handle is made clear. In addition, since the bright line that is generated along the edge portion of the concave portion on the vehicle body by the light emitted from the luminous surface becomes continuous, the position of the edge portion of the concave portion on the vehicle body also becomes clear.

Here, a longitudinal central point of the luminous surface is preferably made to coincide with a longitudinal central point of the door handle. This is because the luminous surface is allowed to be disposed at the center of the door handle. By adopting this configuration, the bright line generated along the edge portion of the concave portion on the vehicle body is also allowed to be generated in a position which corresponds to the luminous surface. Consequently, the person who opens or closes the door can visually recognize the illumination by the luminous surface of the light transmitting element and the bright light generated along the edge portion, thereby the person being allowed to grip the center of the door handle accurately.

According to a fourth configuration of the invention, in the third configuration, the luminous surface of the light transmitting element is formed from one end side to the other end side of the door handle.

The longitudinal length of the door handle can be determined in relation to the length (a horizontal linear distance of the concave portion on the vehicle body) of the concave portion which is formed on the vehicle body in the position which lies at the rear of the door handle. With the length of the door handle being longer than the length of the concave portion on the vehicle body, in the event that the length of the luminous surface of the light transmitting element is made to be a length which extends from one end side to the other end side of the door handle, light emitted from the luminous surface of the light transmitting element can illuminate most of the edge portion of the concave portion on the vehicle body. Consequently, a ring-shaped illumination is observed which is formed by the illumination by the luminous surface of the light transmitting element and the bright line generated along the concave portion on the vehicle body, whereby the person who opens or closes the door can so open or close the door being guided by the ring-shaped illumination, thereby the convenience being further enhanced.

According to a fifth configuration of the invention, in any of the first to fourth configurations of the invention, the light transmitting element is incorporated in an upper edge portion of the door handle.

Since the door handle normally lies below the level of the eyes of the person who opens or closes the door, it is easy for the person to visualize the upper edge portion of the door handle. Consequently, by disposing the light transmitting element along the upper edge portion of the door handle, the position of the door handle can be grasped more easily.

BRIEF DESCRIPTION OF THE DRAWINGS

FIG. 4 is a perspective view of a vehicle.

DESCRIPTION OF THE PREFERRED EMBODIMENTS

Figure 1A:
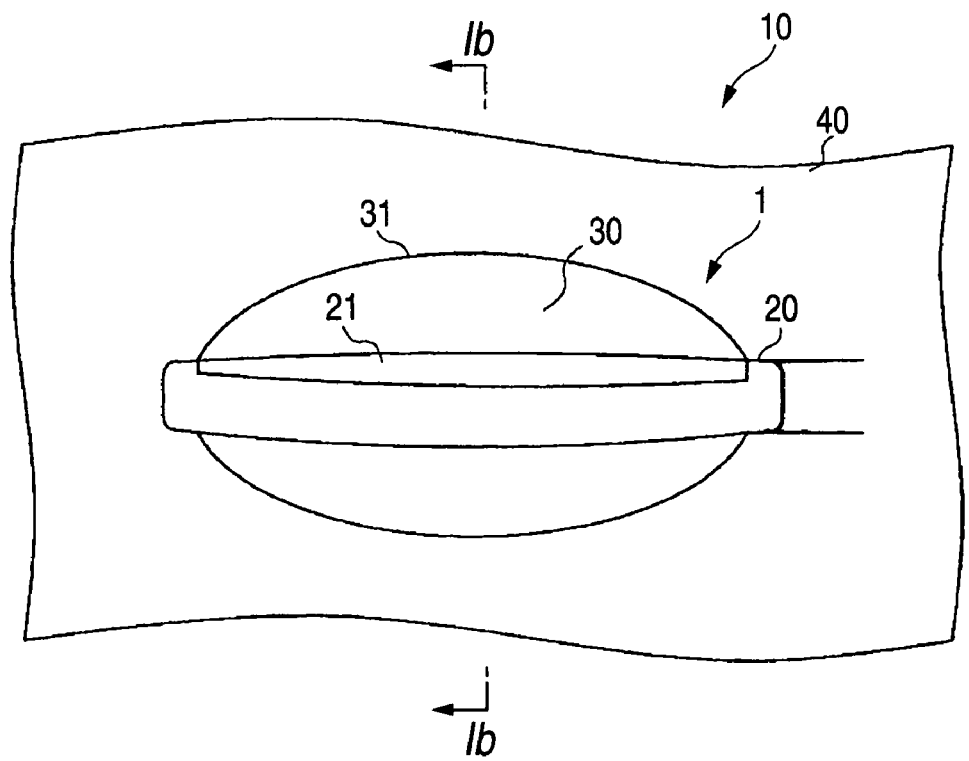
FIG. 1(A) is a front view of a door handle of a vehicle.

Hereinafter, constituent elements of the invention will be described.

(Light Source)

There is imposed no specific limitation on the type of the light source, but the light source is preferably an LED lamp which is small in size and which has resistance to impact. There is imposed no specific limitation on the type of the LED lamp, and an LED lamp of a shell-type, SMD-type or the like can be adopted. In the event that light is introduced into a light transmitting element which is elongated in the direction of optical axis, a shell-type LED lamp is preferably used because a high directivity can be provided thereby.

There is imposed no specific limitation on the color of light emitted from the LED lamp, either. However, it is preferable to adopt colors which make illumination conspicuous against the body color of the vehicle. LED lamps can be used which emit white, blue, red and green lights.

(Light Transmitting Element)

As materials for the light transmitting element, it is possible to raise light transmissive materials such as synthetic resins including acrylic resin, polycarbonate resin, polyethylene terephthalate (PET), silicone resin and epoxy resin and inorganic materials including glass. In the event that light is introduced in a lengthwise direction of the light transmitting element, it is preferable to use acrylic resin which provides a small light diffusion property and a high light transmitting function.

The light transmitting element has a light incident surface and a luminous surface. In the event that light is introduced into an elongated light emitting element, since the intensity of the light so introduced is dampened as it travels along the light transmitting element, a light introducing surface may be formed at both ends of the light emitting element so as to introduce light from both end faces of the light transmitting element to thereby reduce irregular illumination.

The luminous surface is made up of an area which is formed on a front side of the door handle (hereinafter, referred to as a primary area) and an area which face the edge portion of the concave portion on the vehicle body (hereinafter, referred to as a secondary area).

The primary area is an area for shedding light that is introduced into the light transmitting element in the direction towards the front side of the door handle (the direction directed from the vehicle side towards the outside). Consequently, the person who opens or closes the door visualizes light emitted from the primary area to thereby grasp the position of the door handle.

The secondary area is an area for shedding light introduced into the light transmitting element towards the edge portion of the concave portion on the vehicle body. Light emitted from the secondary area illuminates the edge portion of the concave portion on the vehicle body. The light so emitted is concentrated on the edge portion of the concave portion on the vehicle body, whereby the bright line is generated. Consequently, the person who opens or closes the door visualizes the bright line so generated to thereby grasp the position of the edge portion of the concave portion on the vehicle body.

Thus, the person who opens or closes the door at night can grasp the position of the door handle and the position of the edge portion of the concave portion on the vehicle body by the light emitted from the primary area and the bright line generated along the edge portion, respectively. Thus, since the person who opens or closes the door inserts his or her hand between those two lights so as to open or close the door, the opening or closing of the door is facilitated.

The primary area is preferably increased in width in a gradual fashion as it goes farther away from the light source. In the vent that light is introduced into an elongated light transmitting element, the intensity of the light is dampened as it travels along the light transmitting element. To cope with this, the width of the luminous surface is increased as the luminous surface lies farther away from the light source, whereby irregular illumination is reduced.

The luminous surface of the light transmitting element is preferably formed continuously along the longitudinal direction of the door handle. By forming continuously the luminous surface of the light transmitting element, light emitted from the light transmitting element forms a continuous light, the person who opens or closes the door is allowed to grasp the position of the door handle easily. In addition, the bright line generated along the edge portion of the concave portion on the vehicle body also becomes continuous, the position of the edge portion can also be grasped easily.

The luminous surface of the light transmitting element is preferably of a length which corresponds to 60% to 95% of the longitudinal length of the door handle. The longitudinal length of the door handle can be determined in relation to the horizontal length of the concave portion which is formed on the vehicle body in the position which lies at the rear of the door handle. In the event that the longitudinal length of the door handle is longer than the horizontal linear distance of the concave portion on the vehicle body, the length of the luminous surface of the light transmitting element is made shorter than the longitudinal length of the door handle, so that the bright line can be generated along the full length of the edge portion of the concave portion on the vehicle body. Consequently, the ring-shaped illumination is generated by the illumination by the luminous surface of the light transmitting element and the bright line generated along the edge portion. Thus, the person who opens or closes the door can open or close the door by being guided by the ring-shaped illumination so formed, thereby the convenience being enhanced further.

A light diffusion agent is preferably contained within the light transmitting element. This is because the diffusion of light introduced into the light transmitting element is promoted so that the luminance of light emitted from the luminous surface is made even. As light diffusion agents, it is possible to use glass having a predetermined grain size, metal such as aluminum, resin having a different refractive index of light from that of the light transmitting element, silica and the like. Note that a light diffusion agent may be distributed in only part of the light transmitting element.

A colored light transmitting element can be used in addition to the transparent clear light emitting element. To obtain a colored light transmitting element, a coloring agent such as a pigment may be contained within the light transmitting element, whereby the color of light that is emitted to the outside can be changed. In addition, a color changing layer may be provided on the light incident surface and the luminous surface of the light transmitting element. The color changing layer can be formed through, for example, printing of a fluorescent material, affixing of a color changing film, application of a light transmissive ink, affixing a colored light transmissive tape and formation of a colored light transmissive layer.

Hereinafter, the invention will be described using an embodiment.

Embodiment 1

Figure 1B:
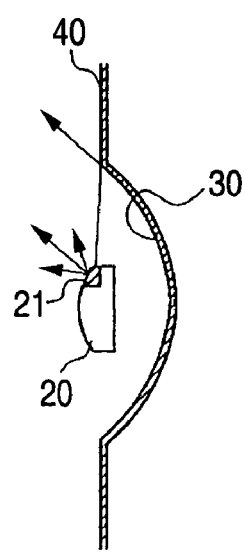
FIG. 1(B) is a sectional view taken along the line I-I in FIG. 1(A).
Figure 2A:
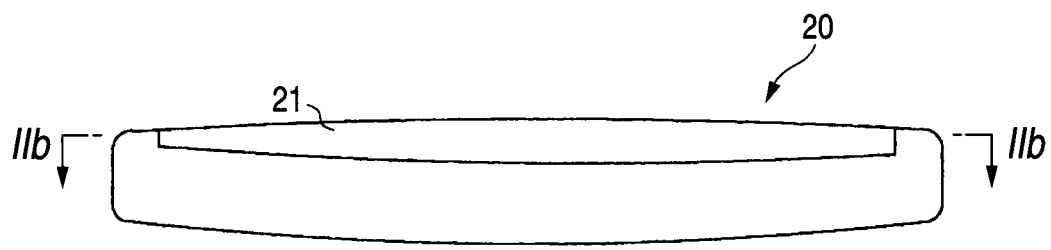
FIG. 2(A) is a front view of the door handle.
Figure 2B:
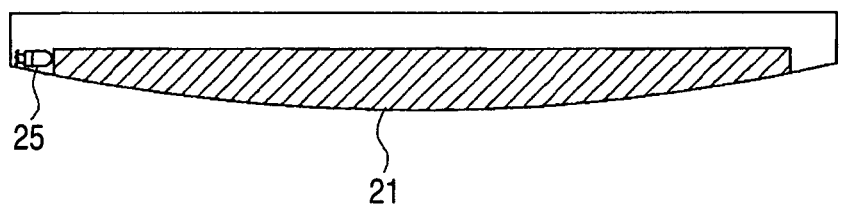
FIG. 2(B) is a sectional view taken along the line II-II in FIG. 2(A).
Figure 3:
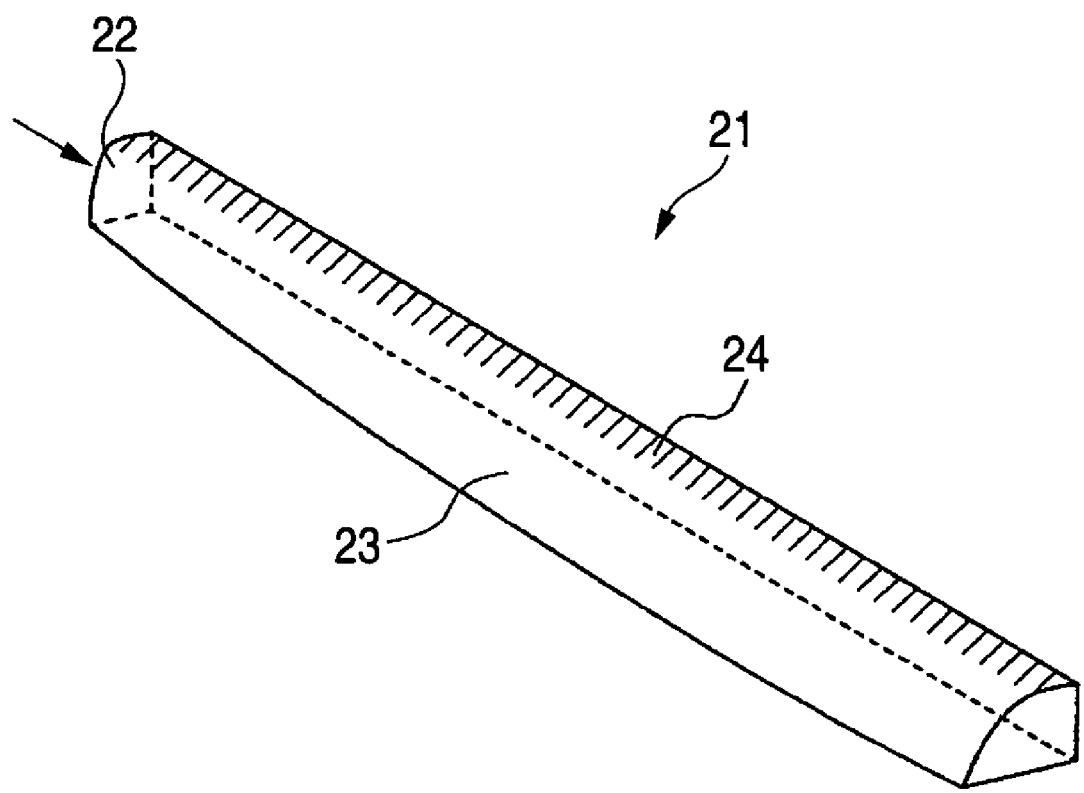
FIG. 3 is a perspective view of a light transmitting element.

FIG. 1(A) is a front view of a door handle portion 10 including a door handle portion illuminating system 1 according to an embodiment of the invention. FIG. 1(B) is a sectional view taken along the line I-I in FIG. 1(A). FIG. 2(A) is a front view of a door handle 20. FIG. 2(B) is a sectional view of the door handle 20 taken along the line II-II in FIG. 2(A). FIG. 3 is a perspective view of a light transmitting element 21. FIG. 4 is a perspective view of a vehicle 100 as viewed at night. The vehicle 100 is indicated by dotted lines, an illumination by a luminous surface 23 of the light transmitting element 21 is indicated by slanting lines, and a bright line generated along an edge portion 31 of a concave portion 30 on a vehicle body is indicated by solid lines.

The door handle 20 is provided on the door handle portion 10, and the concave portion 30 is formed on the vehicle body in a position which lies at the rear of the door handle 20. The concave portion 30 constitutes an insertion opening for the hand which is used when the door is opened or closed.

The light transmitting element 21 is incorporated in the door handle 20. The light transmitting element 21 is made of an acrylic resin which contains a light diffusion agent. As is shown in FIG. 3, the light transmitting element 21 includes a light introducing surface 22, and luminous surfaces 23, 24. The luminous surface 24 is indicated by slanting lines as a matter of convenience. The luminous surface 23 constitutes an area which is exposed on a front side of the door handle 20. The width of the luminous surface 23 is made to be gradually increased as the luminous surface 23 goes farther away from the light introducing surface 22. By adopting this configuration, the intensity of light introduced into the light transmitting element 21 is prevented from being dampened as it travels along the light transmitting element 21, whereby the occurrence of irregular illumination is mitigated. Since light emitted from the luminous surface 23 is shed to the front side of the door handle 20, the person who opens or closes the door can visualize the light so as to grasp the position of the door handle 20.

The luminous surface 24 constitutes an area which faces the edge portion 31. Light introduced into the light transmitting element 21 is emitted from the luminous surface 24 to illuminate the edge portion of the concave portion 30 which faces the luminous surface 24. When the light is shed to the edge portion 31, since the light is concentrated on the edge portion 31, a bright light is generated. The person who opens or closes the door can visualize the bright line so as to grasp the position of the edge portion 31 of the concave portion 30.

As is shown in FIG. 2, the light transmitting element 21 is disposed in an upper edge portion of the door handle 20. Since the door handle 20 lies below the level of the eyes of the person who opens or closes the door, the position of the door handle 20 becomes easy to be visualized by disposing the light transmitting element 21 in the upper edge portion of the door handle 20.

In addition, the light emitting element 21 is incorporated along a longitudinal direction of the door handle 20. The length of the light transmitting element 21 is about 90% of the longitudinal length of the door handle 20. In this embodiment, the length of the light transmitting element 21 is made to be substantially the same as the horizontal linear distance of the edge portion 31 of the concave portion 30, whereby light emitted from the luminous surface 24 can illuminate most of the edge portion 31. Consequently, the bright line is generated over most of the edge portion 31, whereby a ring-shaped illumination is formed by the bright line so generated and the illumination by the luminous surface 23. The person who opens or closes the door can so open or close the door by being guided by the illumination, thereby the convenience being enhanced.

Note that an LED 25 is disposed so that light is introduced into the light transmitting element 21 in a longitudinal direction thereof. The LED 25 is connected to a control circuit (not shown), so that the LED 25 is lit, for example, when a keyless entry system switch is turned on. Namely, the hand insertion opening can be illuminated before the door is opened. In addition, the position and angle of the LED 25 are adjusted so that light of the LED 25 is introduced perpendicular to the light introducing surface 22 of the light transmitting element 21. In addition, as the color of light emitted from the LED 25, a white light is used which is well conspicuous against the color of the surface of the vehicle body (a black metallic color).

The invention is not limited at all to the mode for the carrying out the invention and the embodiment which have been described heretofore. Various modifications are included in the invention which can easily be made by those skilled in the art to which the subject invention pertains without departing from the spirit and scope of the invention.

What is claimed is:

1. A door handle portion illumination system for illuminating a door handle portion, comprising:
   a door handle;
   a concave portion, formed on a vehicle body at a rear of the door handle;
   a light transmitting element, incorporated in the door handle and comprising a luminous surface including an area exposed to a front side of the door handle and an area facing an edge portion of the concave portion; and
   a light source, emitting a light that is introduced into the light transmitting elements,
   wherein said light introduced into said light transmitting element is emitted from the luminous surface,
   wherein said light emitted from the area of the luminous surface facing the edge portion of the concave portion is concentrated on the edge portion by the luminous surface such that the edge portion of the concave portion appears as a bright line, and
   wherein said bright line of said luminous surface forms a ring-shaped illumination of said edge portion of said concave portion.

2. The door handle portion illumination system as set forth in claim 1, wherein the luminous surface of the light transmitting element is gradually increased in width as the luminous surface goes farther away from the light source.

3. The door handle portion illumination system as set forth in claim 1, wherein the luminous surface of the light transmitting element is formed continuously along a longitudinal direction of the door handle.

4. The door handle portion illumination system as set forth in claim 3, wherein the luminous surface of the light transmitting element is formed from one end side to an other end side of the door handle.

5. The door handle portion illumination system as set forth in claim 1, wherein the light transmitting element is incorporated in an upper edge portion of the door handle.

6. The door handle portion illumination system as set forth in claim 1, wherein a part of said light from said light source which is introduced into said light transmitting element is emitted from the area of the luminous surface exposed to the front side of the door handle, and
   wherein an other part of said light from said light source which is introduced into said light transmitting element is emitted from said area facing the edge portion of the concave portion.

7. The door handle portion illumination system as set forth in claim 6, wherein said other part of said light emitted from said area facing the edge portion of the concave portion is concentrated on the edge portion by the luminous surface such that the edge portion of the concave portion appears as said bright line.

8. The door handle portion illumination system as set forth in claim 1, wherein said light transmitting element comprises a light diffusion agent.

9. The door handle portion illumination system as set forth in claim 1, wherein said light transmitting element comprises one of polycarbonate resin, polyethylene terephthalate, silicone resin, epoxy resin, and glass.

10. The door handle portion illumination system as set forth in claim 1, wherein said luminous portion of said light transmitting element has a length that is in a range from 60% to 95% of a longitudinal length of the door handle.

11. The door handle portion illumination system as set forth in claim 8, wherein said light transmitting element comprises acrylic resin.

12. The door handle portion illumination system as set forth in claim 8, wherein said light diffusion agent comprises one of glass, aluminum, and silica.

13. The door handle portion illumination system as set forth in claim 8, wherein a portion of said light transmitting element is devoid of said light diffusion agent.

14. The door handle portion illumination system as set forth in claim 1, wherein said light transmitting element comprises a coloring agent.

15. The door handle portion illumination system as set forth in claim 1, wherein said light transmitting element has a length which is substantially equal to a horizontal linear distance of the edge portion of the concave portion.

* * * * *